United States Patent
Baumgartner et al.

(10) Patent No.: US 7,914,264 B2
(45) Date of Patent: Mar. 29, 2011

(54) CONTROLLABLE DRIVE FOR A MOTOR VEHICLE, IN PARTICULAR FOR A COOLANT PUMP

(75) Inventors: Roland Baumgartner, Vaihingen/Enz (DE); Ralf Maus, Korntal-Münchingen (DE)

(73) Assignee: Behr GmbH & Co. KG, Stuttgart (DE)

( * ) Notice: Subject to any disclaimer, the term of this patent is extended or adjusted under 35 U.S.C. 154(b) by 286 days.

(21) Appl. No.: 11/555,937

(22) Filed: Nov. 2, 2006

(65) Prior Publication Data
US 2007/0110594 A1    May 17, 2007

(30) Foreign Application Priority Data
Nov. 2, 2005  (DE) .................. 10 2005 052 559

(51) Int. Cl.
*F04B 49/03*    (2006.01)
*F04B 9/00*     (2006.01)
*F16D 31/00*    (2006.01)

(52) U.S. Cl. ................. 417/223; 417/319; 192/58.61

(58) Field of Classification Search .............. 417/233, 417/362, 420, 223, 319; 192/58.61
See application file for complete search history.

(56) References Cited

U.S. PATENT DOCUMENTS

| | | | | |
|---|---|---|---|---|
| 2,866,528 A * | 12/1958 | Jacobs | ............ | 192/84.7 |
| 3,624,768 A * | 11/1971 | Nussli | ............ | 192/84.96 |
| 5,014,836 A * | 5/1991 | Harima et al. | ............ | 192/58.8 |
| 5,030,181 A * | 7/1991 | Keller | ............ | 475/150 |
| 5,152,384 A | 10/1992 | Brown | | |
| 5,722,523 A * | 3/1998 | Martin | ............ | 192/58.61 |
| 5,937,983 A | 8/1999 | Martin et al. | | |
| 6,551,075 B2 * | 4/2003 | Gabrieli et al. | ............ | 417/365 |
| 6,663,362 B1 | 12/2003 | Lentz et al. | | |
| 7,467,930 B2 * | 12/2008 | Ozaki et al. | ............ | 417/423.14 |
| 7,475,764 B2 * | 1/2009 | Schultheiss et al. | ......... | 192/48.2 |
| 2003/0123995 A1 | 7/2003 | Light et al. | | |
| 2005/0196297 A1 | 9/2005 | Baumgartner et al. | | |
| 2006/0230824 A1 * | 10/2006 | Daigre et al. | ............ | 73/168 |
| 2007/0080039 A1 * | 4/2007 | Park | ............ | 192/85 AA |
| 2008/0246465 A1 * | 10/2008 | Butzmann | ............ | 324/174 |

FOREIGN PATENT DOCUMENTS

| | | |
|---|---|---|
| DE | 195 33 641 A1 | 3/1997 |
| DE | 196 45 478 A1 | 5/1998 |
| DE | 197 46 359 A1 | 7/1998 |
| DE | 692 27 169 T2 | 4/1999 |
| DE | 199 56 380 C1 | 1/2001 |
| DE | 10 2004 009 073 A1 | 9/2005 |
| EP | 1 326 028 A2 | 7/2003 |
| EP | 1 566 526 A2 | 8/2005 |

* cited by examiner

*Primary Examiner* — Devon C Kramer
*Assistant Examiner* — Bryan Lettman
(74) *Attorney, Agent, or Firm* — Foley & Lardner LLP

(57) ABSTRACT

A controllable drive (1) suitable for a motor vehicle coolant pump (2) comprises a rotatably mounted shaft (5), a driven member (7) which is rotationally fixedly mounted on the shaft (5), a driving member (9) which is mounted so as to be rotatable relative to the shaft (5), and a coupling region (7/8) which is arranged between the driving and driven members (9, 7) and holds a viscous fluid. At least one first flow path and at least one second flow path connect a fluid reservoir to the coupling region (7/8), and an actuation device (11a, 11b, 12, 13, 14) changes at least one passage opening of at least one flow path. A coupling housing (8, 8a, 8b) is connected to the driving member (9), and the actuator (14) is arranged within the coupling housing (8, 8a, 8b).

20 Claims, 2 Drawing Sheets

CONTROLLABLE DRIVE FOR A MOTOR VEHICLE, IN PARTICULAR FOR A COOLANT PUMP

CROSS-REFERENCE TO RELATED PATENT APPLICATIONS

The right of foreign priority is claimed under 35 U.S.C. § 119(a) based on Federal Republic of Germany Application No. 10 2005 052 559.8, filed Nov. 2, 2005, the entire contents of which, including the specification, drawings, claims and abstract, are incorporated herein by reference.

BACKGROUND OF THE INVENTION

The present invention relates to a controllable drive for a motor vehicle, in particular a fluid friction drive that is suitable for driving an engine coolant pump.

The commonly assigned, earlier filed German patent application No. 10 2004 009 073.4 discloses a controllable drive for a coolant pump for a motor vehicle, wherein the control is preferably performed by means of a controllable fluid friction coupling which is connected between the drive, preferably a pulley, and the rotor of the coolant pump. The fluid friction coupling is actuated by means of an actuator which is preferably embodied as a magnetic coil and interacts with an armature which actuates valves for filling and evacuating the working space of the fluid friction coupling. In the earlier patent application, the actuator, which is anchored in a stationary manner, or the magnetic coil is arranged outside the coupling, while the armature which is acted on by the magnetic coil is situated within the coupling. There is therefore a coupling housing wall, made from different materials, situated between the magnetic coil and the armature, with both non-magnetically-conductive material as well as magnetically conductive (ferromagnetic) material being provided. A disadvantage of this construction is that the magnetic flux from the coil to the armature is disrupted and is adversely affected in terms of its effectiveness, by the coupling housing that separates the two. As a result, the coil for generating the required attractive force must be dimensioned to be larger on account of the magnetic losses, resulting in additional weight and additional costs.

SUMMARY OF THE INVENTION

One object of the present invention is therefore to provide an improved controllable drive of the aforementioned type wherein the efficiency of the actuator for actuating the control device is increased, and therefore the weight and costs of the drive are reduced.

Another object of the invention is to provide an improved coolant pump assembly and a motor vehicle embodying the improved cooling pump assembly.

According to one aspect of the invention, there has been provided a controllable drive suitable for use in a coolant pump, comprising: a rotatably mounted shaft; a driven member which is rotationally fixedly mounted on the shaft; a driving member which comprises a coupling housing and which is mounted so as to be rotatable relative to the shaft and to form a coupling region between the driving member and the driven member for holding a viscous fluid; a fluid reservoir communicating with the coupling region via at least one first flow path and at least one second flow path for the viscous fluid; and an actuation device for controlling at least one of said flow paths, wherein—the actuation device is arranged within the coupling housing.

In accordance with another aspect of the invention, there is provided a coolant pump assembly for an engine, comprising a coolant pump having a housing with a housing throat, and a drive as defined above, wherein the shaft is mounted in the housing throat and the coupling housing of the drive is mounted on the housing throat.

The invention further provides a motor vehicle comprising an engine and a coolant pump assembly as defined above for circulating engine coolant in the engine.

Further objects, features and advantages of the present invention will become apparent from the detailed description of preferred embodiments that follows, when considered together with the accompanying figures of drawing.

DETAILED DESCRIPTION OF THE PREFERRED EMBODIMENTS

Figure 1:
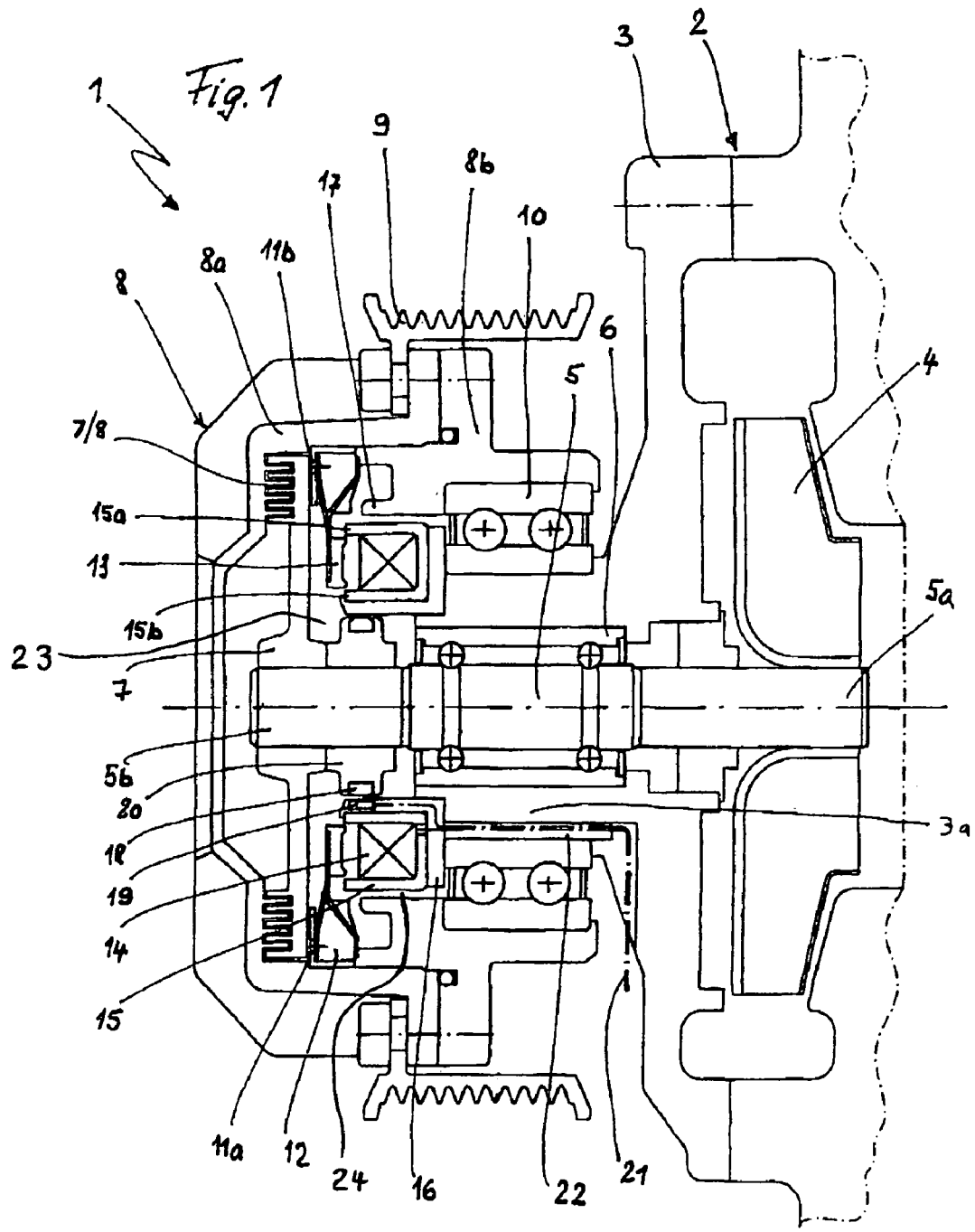
FIG. 1 is a cross-sectional view showing a controllable drive for a coolant pump according to the invention.

The invention provides a design with the actuator or magnetic coil being arranged within the coupling. There is therefore no coupling wall or solid material between the armature plate and the magnetic coil which could disrupt the magnetic flux between the coil and the armature. Rather, the arrangement according to the invention of the magnetic coil within the coupling makes it possible for a closed magnetic field to form, resulting in an increase in the attractive force acting on the armature. As a result, the magnetic coil can be dimensioned to be smaller, reducing the weight and costs of the entire drive.

As before, the magnetic coil is anchored in a stationary manner, while the armature rotates with the coupling housing or the drive input body. In order to prevent contact between the armature and the magnetic coil, according to the invention, a stop is provided on the coupling housing, this stop limiting the axial movement of the armature in the direction of the magnetic coil in such a way that a gap remains in each case between the armature and the magnetic coil.

In order to further improve the magnetic flux, the magnetic coil is preferably arranged in a casing which is approximately horseshoe-shaped in cross section and is made from a magnetically conductive material. The ends of the U-shaped coil housing project beyond the coil in the axial direction, and together with the concentrically arranged armature, form a closed, i.e., uninterrupted, magnetic circuit. The field lines of the magnetic circuit are therefore not disrupted or deflected and thus run concentrically and in a clustered fashion. This provides the advantage that the armature is optimally situated in the magnetic flux, and a relatively small coil can be used in order to apply the required attractive force.

According to a further preferred embodiment of the invention, the magnetic coil or the coil housing is encased by a plastic injection-molded encapsulation, the casing simultaneously serving as a retaining means and serving to protect the magnetic coil. The injection-molded encapsulation can also be utilized to hold and protect electrical supply lines.

According to a further advantageous embodiment of the invention, a speed measuring arrangement is integrated into the controllable drive or coupling housing. The speed measuring arrangement comprises at least one, preferably six permanent magnets which rotate with the pump shaft, and one speed sensor which is arranged so as to be stationary and preferably operates according to the known Hall principle. The permanent magnets are preferably fixedly connected to the shaft in a holder embodied as a plastic ring. The speed sensor is advantageously accommodated in, e.g., molded into, the plastic injection-molded encapsulation. The speed measurement device allows a higher level of control accuracy to be obtained.

According to another preferred embodiment of the invention, the controllable drive is embodied as a fluid friction coupling of the general type that is known per se, with the housing, which is driven via a pulley, driving a coupling disk which is arranged on the shaft. The speed is controlled by controlling the filling of the working space of the fluid friction coupling. An inlet valve and a return valve between the working space and the reservoir are actuated by the actuator and the armature, in conjunction with a return spring.

According to a further preferred embodiment of the invention, the fluid friction coupling is mounted on the throat of a coolant pump housing, preferably by means of a double-row rolling bearing. The magnetic coil and the armature are arranged between the bearing and the coupling disk. This results in a compact design.

Turning now to the drawings, FIG. 1 shows a controllable drive 1 for a coolant pump 2 of a motor vehicle (not illustrated in detail). The coolant pump 2 has a housing 3 with a throat 3a and a pump wheel or impeller 4 which is arranged in a rotationally fixed manner on a shaft end 5a of a pump shaft 5. The pump shaft 5 is mounted in the throat 3a by means of a double-row ball bearing 6. A coupling disk 7 is arranged in a rotationally fixed manner on a shaft end 5b, this coupling disk 7 being part of a fluid friction coupling which also has a driving coupling housing 8 comprising a coupling cover 8a and a coupling base body 8b.

The coupling housing 8 is driven by a pulley 9 which itself is driven by the internal combustion engine of the motor vehicle by means of a belt drive (not illustrated in detail). The coupling housing 8 is supported so as to be rotatable relative to the throat 3a of the pump housing 3, by means of the base body 8b via a coupling bearing 10 which is preferably embodied as a double-row deep-groove ball bearing. The forces resulting from the belt drive are therefore introduced relatively directly into the throat 3a of the pump housing 3. The fluid friction coupling 7, 8 is in principle of the same general design as that described in the earlier filed, commonly assigned German patent application No. 10 2004 009 073.4, published on Sep. 15, 2005 and published on Aug. 24, 2005 as EP 1 566 516 A2, which is hereby incorporated by reference in its entirety into the disclosure of the present application.

The filling level of the fluid friction coupling 7, 8 in the coupling region (working space 7/8) is thus controlled by means of at least two valves 11a, 11b, an inlet valve and a discharge device, in conjunction with a return spring 12 on which an annular armature plate 13 is arranged. A fluid reservoir 23 communicates with the coupling region via at least one first flow path and at least one second flow path for the viscous fluid.

An actuator which is preferably designed as a magnetic coil 14 is arranged so as to be stationary, coaxially with respect to the armature plate 13, e.g., fastened at the end side to the throat 3a of the pump housing 3. The actuation device is arranged within a fluid chamber 24. The magnetic coil 14 is enclosed by a magnetically conductive coil housing 15 which is U-shaped in cross section, and is encased by a plastic injection-molded encapsulation 16. The magnetic coil 14 with its coil housing 15 is thus situated within the coupling housing 8, in the direct vicinity of the axially moveable armature plate 13. An approximately annular stop 17 is preferably arranged on the coupling housing, e.g., on the coupling base body 8b, whereby the stop 17 limits the axial movement of the armature plate 13 in the direction of the magnetic coil 14. This ensures that the armature plate 13, which rotates with the coupling housing 8, does not come into contact with the stationary magnetic coil 14 or coil housing 15; a gap therefore always remains when the armature plate 13 is attracted. The coil housing 15 has two U-limbs whose ends 15a, 15b project beyond the magnetic coil 14 in the axial direction and form a magnetic circuit with the armature plate 13. This results in an undisrupted magnetic flux and a high attractive force.

The controllable drive 1 preferably also has an integrated speed measuring device which comprises permanent magnets 18 that rotate with the pump shaft 5, and a fixed speed sensor 19, which preferably operates according to the known Hall principle and is held in the plastic injection-molded encapsulation 16. The permanent magnets 18 are arranged in a plastic ring 20 which is rotationally fixedly connected to the pump shaft 5. Current is supplied to the magnetic coil 14 and to the speed sensor 19 by means of electrical cables 21 which, on the one hand, are preferably held in the plastic injection-molded encapsulation 16, and on the other hand, are preferably guided out through a cut-out 22, which runs in the axial direction within the coupling bearing 10, in the throat 3a.

Figure 2:
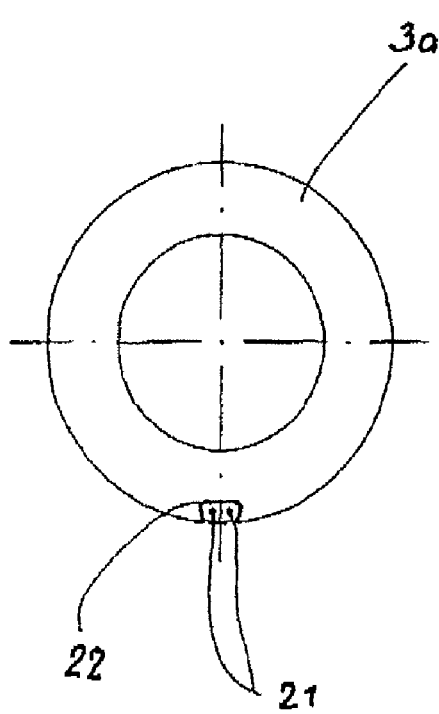
FIG. 2 is a detailed cross-sectional view showing a partial section through the throat of the coolant pump housing.

FIG. 2 shows a partial cross-section through the throat 3a of the pump housing 3, showing the cut-out 22, in which the two electrical cables 21 are held and guided. The cables 21 are therefore protected, in particular during assembly of the coupling bearing 10 onto the throat 3a, and mounting of the magnetic coils 14, 15.

Figure 3:
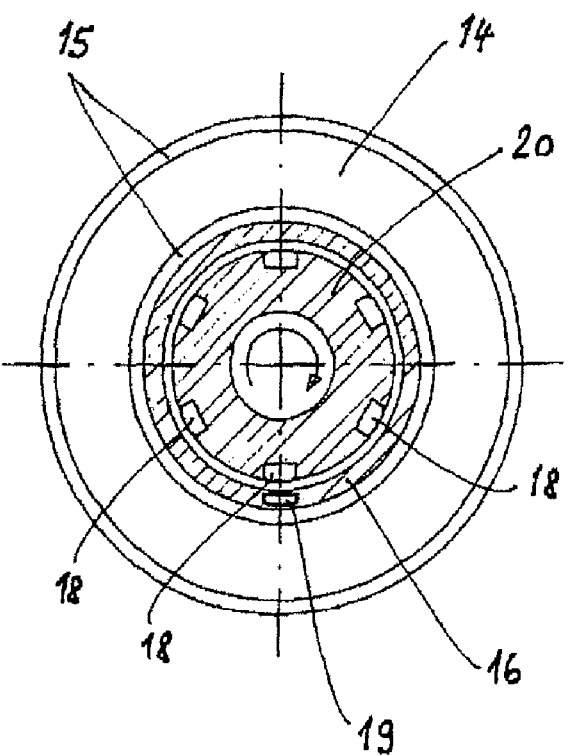
FIG. 3 is a partial cross-sectional view showing a section through a speed measuring device in the region of the magnetic coil.

FIG. 3 shows a partial cross-section through the speed measuring device, in the region of the ring 20 and of the speed sensor 19. Six permanent magnets 18 are preferably arranged in the ring 20 at the periphery thereof, with the ring 20 being made from non-magnetically-conductive material, for example, plastic. The speed sensor 19 is preferably embedded in (molded into) the plastic injection-molded encapsulation 16 at a small radial distance from the ring 20. The speed of the pump shaft can be measured and supplied to a control device (not illustrated) in this way. The magnetic coil 14 and the coil housing 15 are supported by the plastic injection-molded encapsulation 16.

The foregoing description of preferred embodiments of the invention has been presented for purposes of illustration and description only. It is not intended to be exhaustive or to limit the invention to the precise form disclosed, and modifications and variations are possible and/or would be apparent in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto and that the claims encompass all embodiments of the invention, including the disclosed embodiments and their equivalents.

What is claimed is:

1. A controllable drive suitable for use in a coolant pump, comprising:
 a rotatably mounted shaft;
 a pump housing with a throat;

a coupling bearing located at a radial distance from the shaft;

a driven member which is rotationally fixedly mounted on the shaft;

a driving member which comprises a coupling housing and which is mounted so as to be rotatable relative to the shaft and to form a coupling region between the driving member and the driven member for holding a viscous fluid, wherein the coupling housing includes a coupling cover and a coupling base body;

a fluid reservoir communicating with the coupling region via at least one first flow path and at least one second flow path for the viscous fluid; and an actuation device for controlling at least one of said flow paths, wherein the actuation device is arranged within a fluid chamber whose boundary comprises the coupling cover, the coupling base body, the throat of the pump housing, and the coupling bearing;

wherein the actuation device forms a portion of a wall of the fluid chamber;

wherein the actuation device is located at a smaller radial distance from the shaft than the coupling bearing;

wherein the actuation device comprises an actuator having a magnetic coil and an axially moveable armature which can be acted on by the magnetic coil;

wherein the controllable drive is configured such that there is no wall or solid material between the armature and the magnetic coil.

2. A drive according to claim 1, wherein the magnetic coil is fastened to the pump housing and is stationary.

3. A drive according to claim 2, wherein the actuation device comprises at least two valves which are actuated by the armature.

4. A drive according to claim 3, wherein the driving member, the coupling housing, the coupling region, the fluid reservoir, the flow paths and the valves form a fluid friction coupling.

5. A drive according to claim 2, further comprising a stop member for preventing the armature from contacting the magnetic coil.

6. A drive according to claim 5, wherein the stop member comprises an annular stop forming part of the coupling housing in a region of the magnetic coil for limiting axial movement of the armature in a direction of the magnetic coil.

7. A drive according to claim 2, wherein the magnetic coil comprises a casing made from a magnetically conductive material and having a U-shaped cross section, and wherein the armature is arranged in such a manner as to form a magnetic circuit which can be induced by the magnet coil.

8. A drive according to claim 7, wherein the magnet coil is held with a coil housing in a plastic encapsulation.

9. A drive according to claim 1, further comprising a speed measuring device arranged within the coupling housing.

10. A drive according to claim 9, wherein the speed measuring device comprises at least one permanent magnet which rotates with the shaft, and a stationary speed sensor.

11. A drive according to claim 10, wherein the speed sensor operates according to the Hall principle.

12. A drive according to claim 10, wherein the at least one permanent magnet is arranged in an annular holder which is fastened to the shaft.

13. A drive according to claim 12, wherein the annular holder is comprised of plastic.

14. A drive according to claim 10, wherein the speed sensor is arranged within a plastic encapsulation.

15. A coolant pump assembly for an engine, comprising a coolant pump having a drive as defined in claim 1, wherein the shaft is mounted in the housing throat and the coupling housing is mounted on the housing throat.

16. A coolant pump assembly according to claim 15, wherein the magnetic coil is anchored in a stationary manner at an end side of the housing throat.

17. A coolant pump assembly according to claim 16, further comprising an axially extending cut-out in the throat of the pump housing for receiving electrical cables which are guided out of the coupling housing from at least the magnetic coil.

18. A motor vehicle comprising an engine and a coolant pump assembly as defined by claim 15.

19. A drive according to claim 1,
wherein the magnetic coil comprises a casing having a U-shaped cross section,
wherein ends of the U-shaped cross section project in an axial direction of the drive toward the axially moveable armature.

20. A drive according to claim 2, wherein the magnetic coil forms the portion of the wall of the fluid chamber.

* * * * *